March 15, 1938. J. A. STREUN 2,111,158
COTTON DRIER
Filed July 24, 1934 2 Sheets-Sheet 1
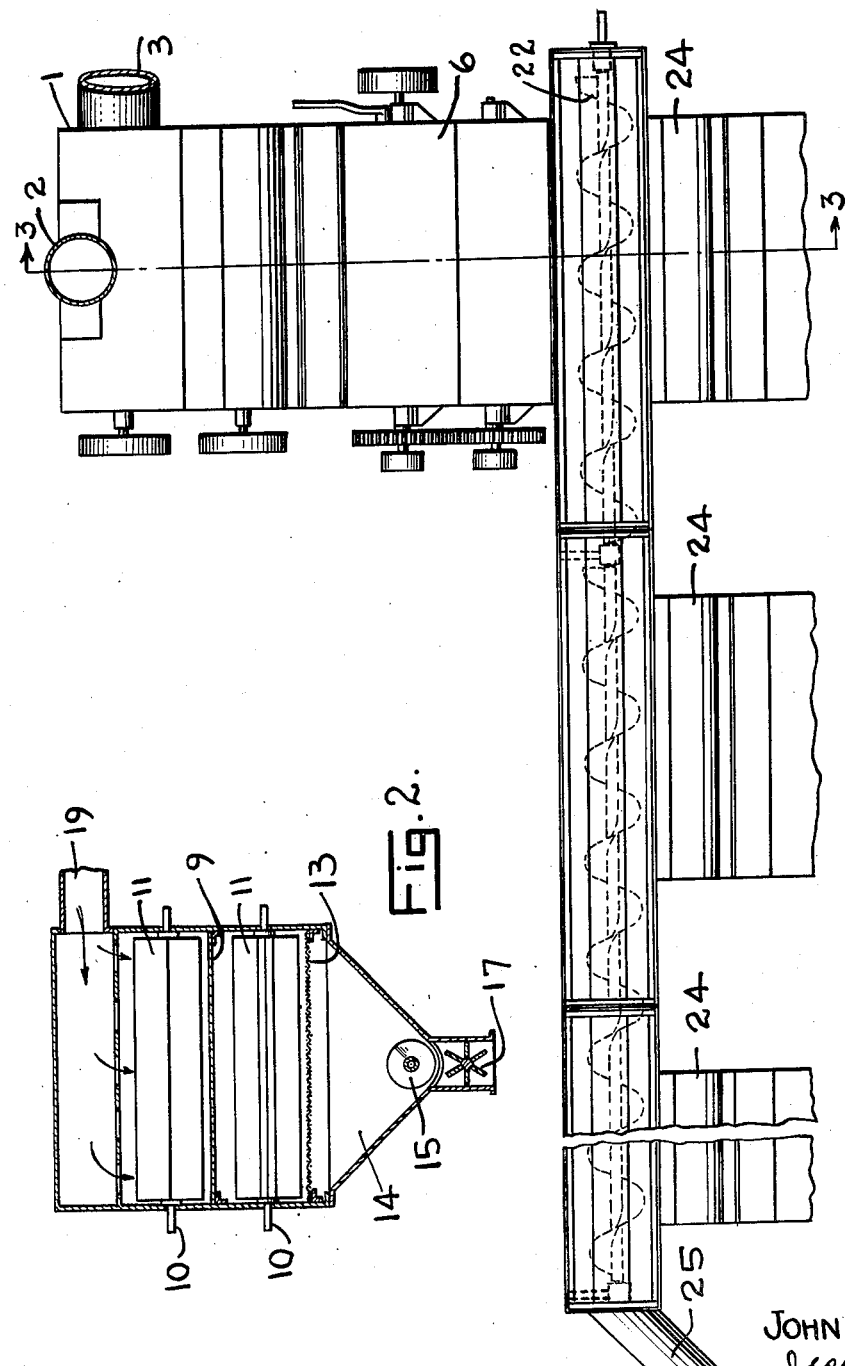
Inventor
JOHN A. STREUN March 15, 1938.　　　J. A. STREUN　　　2,111,158
COTTON DRIER
Filed July 24, 1934　　　2 Sheets-Sheet 2

Inventor
JOHN A. STREUN
By Jesse R. Stone
Lester B. Clark
Attorneys

Patented Mar. 15, 1938

2,111,158

UNITED STATES PATENT OFFICE 2,111,158

COTTON DRIER

John Arnold Streun, Sherman, Tex., assignor to Hardwicke-Etter Company, Sherman, Tex., a corporation Application July 24, 1934, Serial No. 736,637

5 Claims. (Cl. 19—93)

My invention relates to devices for drying freshly picked cotton before it is submitted to the ginning operation.

It happens occasionally that the cotton when picked in the field is delivered to the gin in wet condition whereby it can not be properly cleaned and the ginning operation is materially interfered with. Some drying means have been previously tested out. The majority of these driers are separate machines employed to dry the cotton before it is introduced into the usual cleaning mechanism. This is a somewhat expensive proceeding and slows down the operation upon the cotton.

I contemplate the provision of a drying device closely associated with the actual mechanism of the cleaner and from which the cotton may be delivered directly to the feeder for the gin.

It is a further object of my invention to provide a drier to be employed with the cleaning mechanism and in which the cotton is kept in a heated condition until the time when it is delivered to the gin.

I aim to overcome the usual difficulty with driers that the cotton is cooled and thus rendered soggy and difficult to gin by maintaining the cotton in a heated condition until it is fed to the gin itself.

The invention consists in the compact and convenient arrangement of the structure and in the combination of the cleaning and drying operations.

In the drawings herewith, Fig. 1 is a broken front elevation showing the arrangement of the drier relative to the conveyer which delivers the cotton to the feeders for the gins, the said feeders being broken away.

Fig. 2 is a transverse section on the plane 2—2 of Fig. 3.

Figure 3:
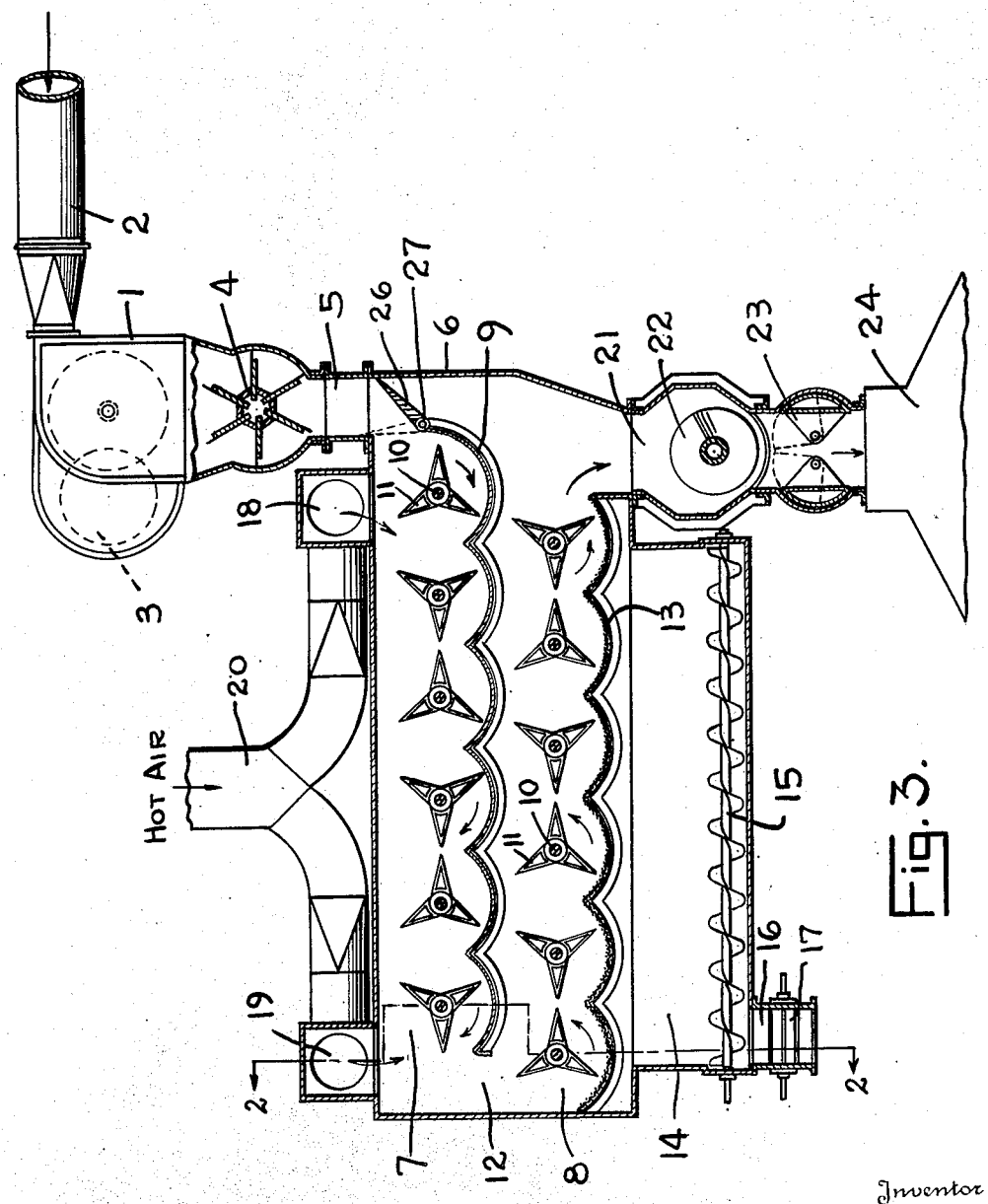
Fig. 3 is a vertical section taken approximately on the plane 3—3 of Fig. 1.

The drying apparatus is arranged at one end of the conveyer which carries the cotton to the gins. In Fig. 3 the general arrangement of the cleaner may be observed. I provide, for the delivering of the cotton to the drier, a cotton separator indicated at 1. The cotton is drawn into this separator through the delivery pipe 2 through a suction fan connected with the dotted line opening shown at 3. The cotton is delivered downwardly from the separator to the rotating valve member 4 which through rotation carries the cotton down through the discharge chute 5 to the interior of the drier 6. The structure of this separator is not new and forms no part of the present invention.

The drier comprises a housing of a generally rectangular shape and having an upper chamber 7 and a lower chamber 8, which are partially separated from each other by the sheet metal partition 9. Said partition is placed immediately below a series of rotating shafts 10 having a plurality of radial blades 11 thereon for engaging and agitating the cotton so as to aerate the same and carry it along to the next succeeding agitator. The partition below each of these separate rotating members is concaved to conform in general to the arc of rotation of the blades about the shafts 10 upon which they are mounted. The partition 9 is imperforate and the upper chamber is maintained solely as a drying chamber.

The chamber 8 below the partition 9 is also equipped with a plurality of rotating shafts 10 with radial blades 11 thereon rotating in the opposite direction from those shown in the upper chamber and acting by their rotation to agitate and move the cotton from left to right as indicated by the arrows. It will be seen that the rotation of the upper agitator acts to move the cotton along from right to left so that it will be discharged through an opening 12 at the left end of the housing, as shown, whereby it will drop by gravity to the lower chamber and there be engaged by the agitating members therein.

Below the lower agitators and forming the floor of the chamber 8 is a foraminated partition 13 through which dirt and chaff from the drying cotton may be sifted out, said dirt and chaff falling downwardly into a lower chamber 14 to be there engaged by a screw conveyer 15 rotating in such manner as to carry the chaff and dirt to the outlet 10. This outlet has therein a rotating valve member 17 similar in structure to the valve member 4 seen at the upper portion of Fig. 3. This valve member rotates to eliminate the dirt and chaff but prevents the passage of the heated air from the housing.

The heated air is delivered into the upper chamber 7 by way of openings 18 and 19, said air being conveyed thereto through the hot air flue 20. It is to be understood that the air may be heated through any approved form of heater and driven through the flue 20 to the upper chamber of the drier in any approved mechanism not shown and forming no part of this invention.

The air passing in through openings 18 and 19 passes directly through the upper portion of the housing and through the upper chamber and then through the passage 12 to the lower chamber and moves in the same direction as the cotton toward the feeders.

The cotton after passing from the lower chamber 8 is delivered into the conveyer housing 21. This conveyer forms the distributor for the cotton to the gins and may be of any preferred form and I have shown, particularly in Fig. 1, a screw conveyer 22. Said conveyer is housed within a polygonal-shaped flue or housing, the walls of which conform rather closely to the outline of the conveyer whereby the cotton is moved from right to left as seen in Fig. 1 and delivered through the change bale valves 23 to the cotton feeders, the upper portion of which is shown at 24. The cotton feeders deliver the cotton directly to the gin and it will be noted that the passage for the hot air thru the drier, the cleaner and the distributor is a closed passage so that the hot air may not escape and the cotton will be conveyed directly to the gin feeders in heated condition. There is no opportunity along the route through which the cotton travels whereby it may be subjected to cold air from the outside or may be allowed to cool before it is delivered directly to the gins. The hot air which finally escapes at the lower side of the apparatus passes out through the overflow end 25 seen in Fig. 1. This end of the distributor discharges therefrom any cotton which may not be fed to the battery of gins below the distributor and this cotton usually falls to the floor where it is later picked up and again passed through the separator, drier and cleaner to the distributor.

It is possible with the apparatus herein shown to operate at intervals on cotton which is already dry and which needs no particular treatment before it is delivered to the gins. To accommodate the handling of batches of cotton which are already dry I have placed a valve 26 adjacent the lower end of the passage 5 from the separator to the drier. Said valve is pivoted at 27 to the opening into the upper chamber from the separator. As will be noted from Fig. 3, said valve is moved from an open position shown in full lines to the dotted line position closing the entry to the upper chamber for the cotton. Thus it will be possible to run the cotton through the drier and cleaner by moving the valve to the position shown in Fig. 3. When dry cotton is received, however, the operator may, if the cotton is dirty, allow it to circulate through the upper and lower chambers without the use of the heated air. However, if the cotton is fairly clean and needs no treatment of this character the valve may be moved to the dotted line position of Fig. 3 so that the cotton will be delivered directly downward to the conveyer 22. This makes it possible to handle cotton coming into the gin of different character. The dry cotton need not necessarily be subjected to the whole drying operation.

The particular features of advantage in my invention lie in the compact combination of the drier with the usual feeding and cleaning apparatus commonly used in connection with the gin. Very little extra apparatus is necessary to dry the cotton coming to the gin. By arranging to maintain the cotton in this heated condition so that it may be still hot at the time it arrives at the gin enables me to gin the cotton more effectively. I have found that where the cotton is heated up in its damp condition and not thoroughly dried it will again tend to become soggy if it is allowed to cool, but if maintained in its heated condition the soggy consistency of the cotton does not exist after agitation in the heated air unless it is allowed to cool. This cooling of the cotton is prevented by the closed arrangement of the passages through which the cotton is conveyed and agitated in the presence of the hot air.

What is claimed as new is:

1. In a device of the character described, a cotton drier including a longitudinal casing, an upper chamber, a row of rotating agitators therein, adapted to agitate said cotton and move it longitudinally of said casing, a partition below said agitators forming an imperforate wall, the upper surface of which conforms to the path of movement of said agitating members, a lower chamber, a series of agitating members therein rotatable to move the cotton in a direction the reverse of that of the cotton in the upper chamber, a foraminated wall below said lower chamber, a conveyer passage below said casing, a conveyer therein upon which cotton is discharged from said casing, cotton feeders below said conveyer, a valve controlled passage between said conveyer passage and said feeders and means to circulate hot air through said chambers and said passages.

2. A cotton drier including a closed casing, means to feed cotton to said casing, mechanical means to agitate said cotton and move the same through said casing, said casing having a discharge opening, a conveyer housing forming a continuation of said casing below said opening, a conveyer therein, hoppers connected with said conveyer housing, cotton feeders below said hoppers, means connected with both ends of said casing to circulate hot air through said casing, said conveyer housing and said hoppers to said feeders whereby said cotton is delivered in a heated condition from said feeders.

3. A cotton drier including an elongated horizontally arranged casing having upper and lower chambers therein, means to feed cotton into said upper chamber, a plurality of transversely positioned rotating shafts in said chambers, agitating arms on said shafts, said shafts being rotatable in a direction to shake up and move the cotton through said upper chamber and then in a reverse direction through said lower chamber, said lower chamber having a discharge opening, a distributor to receive cotton from said opening and deliver said cotton to a plurality of gins, hoppers above said gins, means connected with both ends of said upper chamber to circulate hot air with said cotton through said upper chamber, said lower chamber, said distributor and through said hoppers, whereby said cotton will be dried throughout its passage therethrough.

4. A cotton drier including a longitudinal casing, upper and lower chambers therein, rotatable agitators transversely of said chambers and rotatable to move cotton longitudinally of said casing, an imperforate wall below the agitators in said upper chamber, means to feed cotton to said upper chambers, a discharge passage for the cotton from said lower chamber, a trough-shaped distributor housing to receive cotton from said lower chamber, a conveyor therein to move the cotton longitudinally of said housing, a hot air flue connected with the opposite ends of said upper chamber, said chambers and housing being closed so that said hot air will be circulated with said cotton through said upper chamber, said lower chamber and said housing.

5. A cotton cleaner including a longitudinal casing, upper and lower chambers therein, said chambers having connection with each other at one end, agitators extending transversely across said chambers and rotatable to beat up and move the cotton in one direction in said upper chamber and in the reverse direction in said lower chamber, a foraminated wall below said lower chamber, a distributor connected with said lower chamber to receive cotton from said casing, hoppers below said distributor through which cotton may be moved therefrom, valves in said hoppers adapted to close the same, and means connected with said upper chamber to circulate hot air longitudinally through each of said chambers and with said cotton through said distributor to said hoppers, the cotton being thus maintained in a heated condition until it is discharged to the said hoppers.

JOHN ARNOLD STREUN.